United States Patent [19]

Mack

[11] Patent Number: 4,934,316
[45] Date of Patent: Jun. 19, 1990

[54] LITTER BOX LINER

[75] Inventor: Robert J. Mack, Aberdeen, N.J.

[73] Assignee: Colgate-Palmolive Company, New York, N.Y.

[21] Appl. No.: 390,034

[22] Filed: Jul. 28, 1989

Related U.S. Application Data

[63] Continuation of Ser. No. 842,339, Mar. 21, 1986, abandoned.

[51] Int. Cl.⁵ ............................................. A01K 1/015
[52] U.S. Cl. ......................................................... 119/1
[58] Field of Search ............................ 119/1; 229/198; 220/403, 410

[56] References Cited

U.S. PATENT DOCUMENTS

| | | | |
|---|---|---|---|
| 2,944,715 | 7/1960 | Vergobbi | 220/403 |
| 3,626,899 | 12/1971 | Spellman | 119/1 |
| 4,082,214 | 4/1978 | Baker | 229/198 X |
| 4,469,046 | 9/1984 | Yananton | 119/1 |
| 4,489,453 | 12/1984 | Blaas et al. | 220/403 X |
| 4,658,989 | 4/1987 | Bonerb | 220/403 X |

*Primary Examiner*—Robert P. Swiatek
*Attorney, Agent, or Firm*—Norman Blumenkopf; Robert C. Sullivan; Murray M. Grill

[57] ABSTRACT

A litter box liner comprising a rectangular absorbent pad having a waterproof backing sheet provided with absorbent material thereon. Glue lines or spots are provided on the top face thereof for holding the liner in a box-like configuration conforming to the contours of the litter box. Other glue lines or spots are provided on the bottom surface of the backing sheet for adhesively bonding the liner to the litter box.

5 Claims, 6 Drawing Sheets

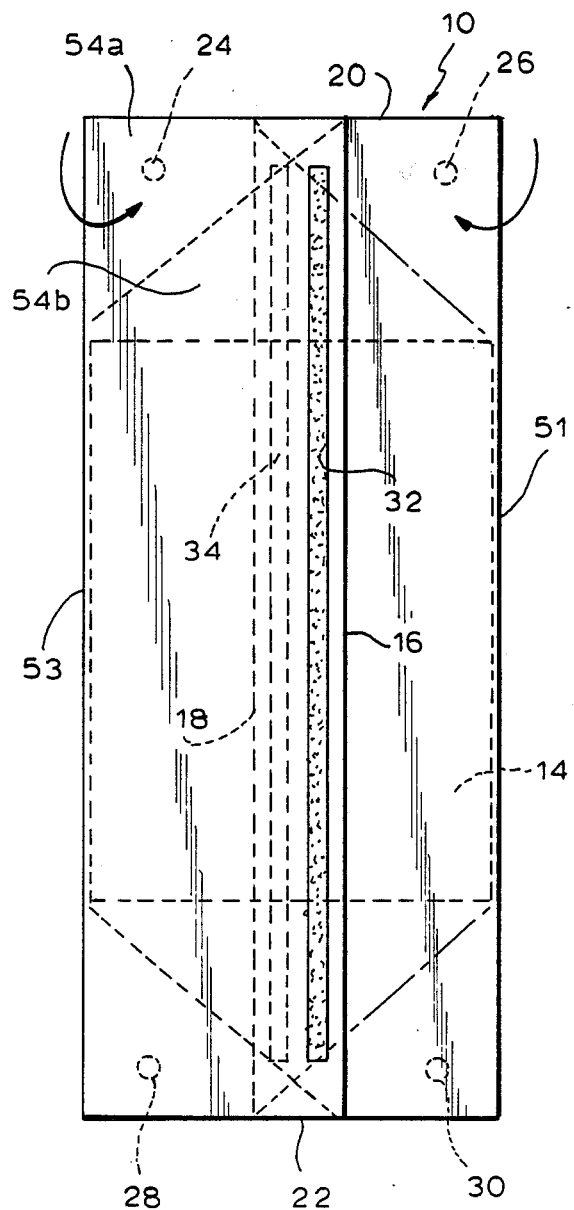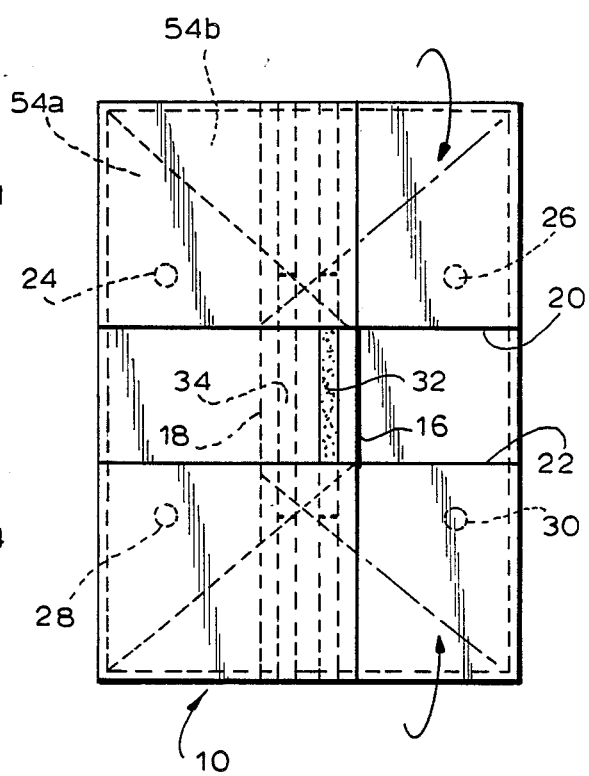

LITTER BOX LINER

This application is a continuation of application Ser. No. 842,339 filed Mar. 21, 1986, and now abandoned.

BACKGROUND OF THE INVENTION

FIELD OF THE INVENTION

This invention relates to a device for use in animal husbandry and, more particularly, to an absorbent liner for an animal litter box.

DESCRIPTION OF THE PRIOR ART

Certain household pets, and in particular cats, are provided by their owners with litter boxes made of wood, metal, plastic or carboard, which are generally of several different sizes, and which receive a suitable amount of solid absorbent material. The absorbent material is particulate and may be treated with various chemical substances to enhance absorbency, reduce odor, have a neutralizing perfume or scent and may contain a bacteriostat or bacteriocide. The solid absorbent particulates are usually left in the litter box, normally until odor begins to develop, such as two or three days, and then the entire litter box must be emptied and cleaned. The solid absorbent particles may be of the type disclosed in U.S. Pat. Nos. 4,494,481; 4,494,482 and 4,517,919 or such absorbent material as is generally commercially available. Another absorbent material employed by various pet owners is sand.

In order to extend the periods between which the litter box needs to be emptied and cleaned, a liner for a litter box has been employed such as disclosed in U.S. Pat. No. 4,469,046. This liner is provided with absorbent fluff from edge to edge and to within two inches of each end. Because of the thickness of the absorbent material, when the absorbent pad is fitted into the litter box, which has restraining side walls, many wrinkles and creases may be formed creating poor fit and an unaesthetic appearance. The wrinkles often provide surfaces for the cat to scratch or claw and may actually provoke the cat to scratch. This scratching and clawing can disturb the contents of the litter box, even to the extent of the removal of the liner itself from the litter box.

SUMMARY OF THE INVENTION

The present invention provides an absorbent liner for litter boxes particularly for the two major sizes generally utilized by the cat fancy and is also useful for the several intermediate size litter boxes and many home made litter boxes. It is provided with adhesive means to hold the liner in a generally smooth box-like configuration and has adhesive means for removably securing the liner to the litter box to prevent removal by a cat or other animal.

The absorbent liner is of generally rectangular shape having a waterproof bottom and has adhesive on the face thereof for holding the liner in an erected condition. The adhesive is a hot melt or pressure-sensitive glue in the form of spots or lines and additional glue spots or lines are formed on the undersurface of the liner for fixing the liner to the peripheral wall of the litter box. These are preferably of a pressure-sensitive adhesive. The pressure-sensitive adhesive may also have the characteristic of repositionability.

BRIEF DESCRIPTION OF THE DRAWINGS

FIG. 3 is a top plan view of the liner in folded condition;
FIG. 3a is similar to FIG. 3, but illustrates the next folding step.

DETAILED DESCRIPTION OF THE INVENTION

Figure 1:
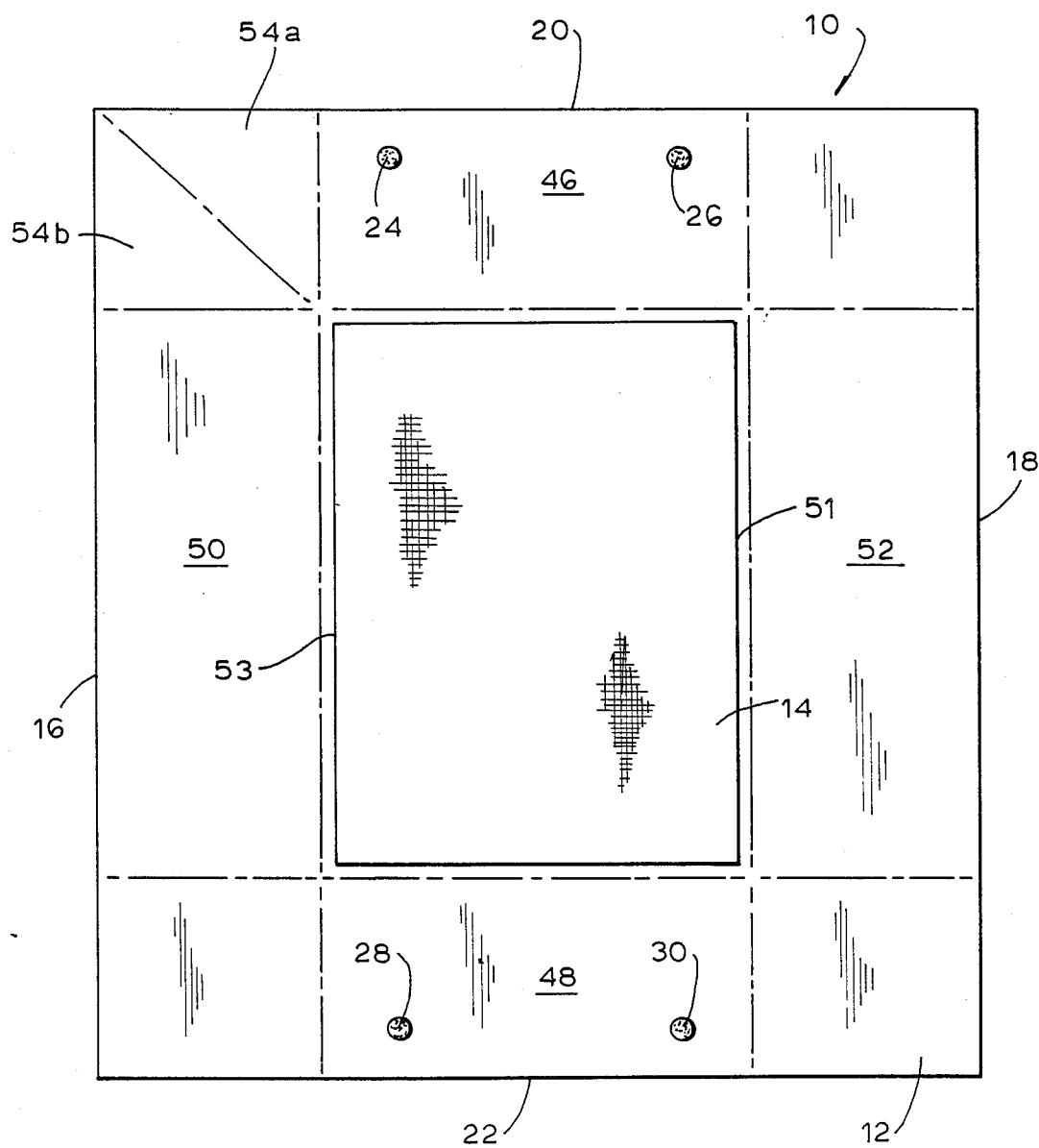
FIG. 1 is a top plan view of the absorbent liner.
Figure 2:
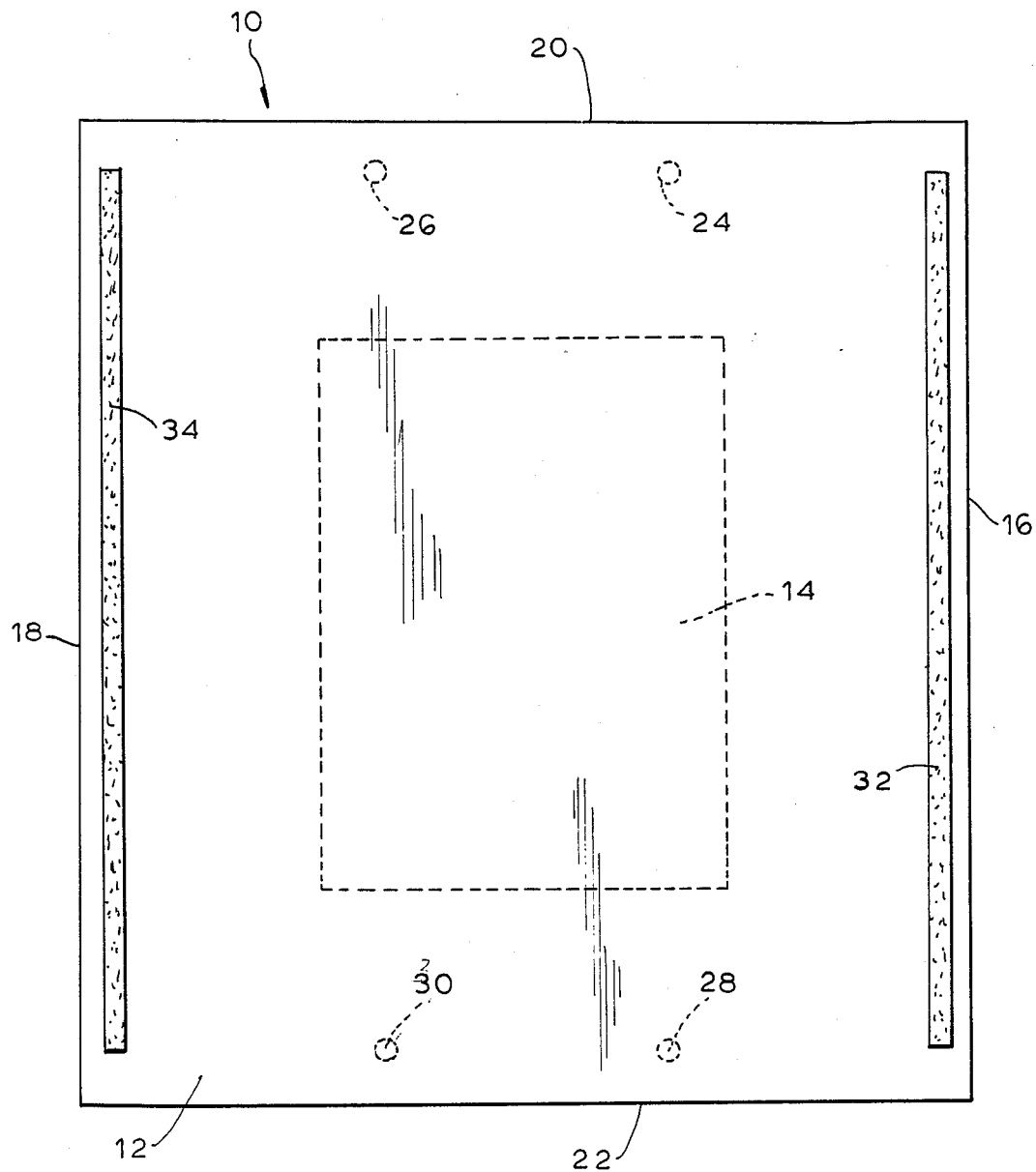
FIG. 2 is a bottom plan view of the liner.

With continuing reference to the accompanying drawings, wherein like reference numerals designate similar parts throughout the various views, reference numeral 10 generally designates an absorbent liner.

The precise materials from which the liner is constructed are in accordance with the various embodiments of absorbent articles according to the state of the art. The liner 10 requires a waterproof backing sheet, such as polyethylene, polypropylene or like film material, and may be transparent, colored or opaque. The backing sheet 12 has absorbent material 14 positioned thereon, which may be bonded to the backing sheet or in the form of layers of sheet absorbent material and may be made of wood fluff, paper or other cellulosic or like material and may be treated with a super absorbent. Material 14 may be comprised of super absorbent in any suitable physical form. A top sheet, not shown, may be employed, if desired.

The liner 10 is a generally rectangular configuration having side edges 16 and 18 and end edges 20 and 22.

Adjacent the end edges 20 and 22 and slightly spaced from the side edges 16 and 18 are glue spots or lines 24, 26 28 and 30. These glue spots or lines 24, 26, 28 and 30 are used for holding the liner in an erected condition when the line 10 is placed in a litter box.

On the back face of the backing sheet 12 and close to the edges 16 and 18 are elongated glue spots or lines 32 and 34, which preferably extend at least about one half the length of the liner 10 and are at least located near ends 20 and 22 for a purpose to be hereinafter explained.

The position and size of the pad 14 on back sheet 12 results in two generally equal width end panels 46 and 48 and also two generally equal width (but preferably wider) side panels 50 and 52.

Figure 3B:
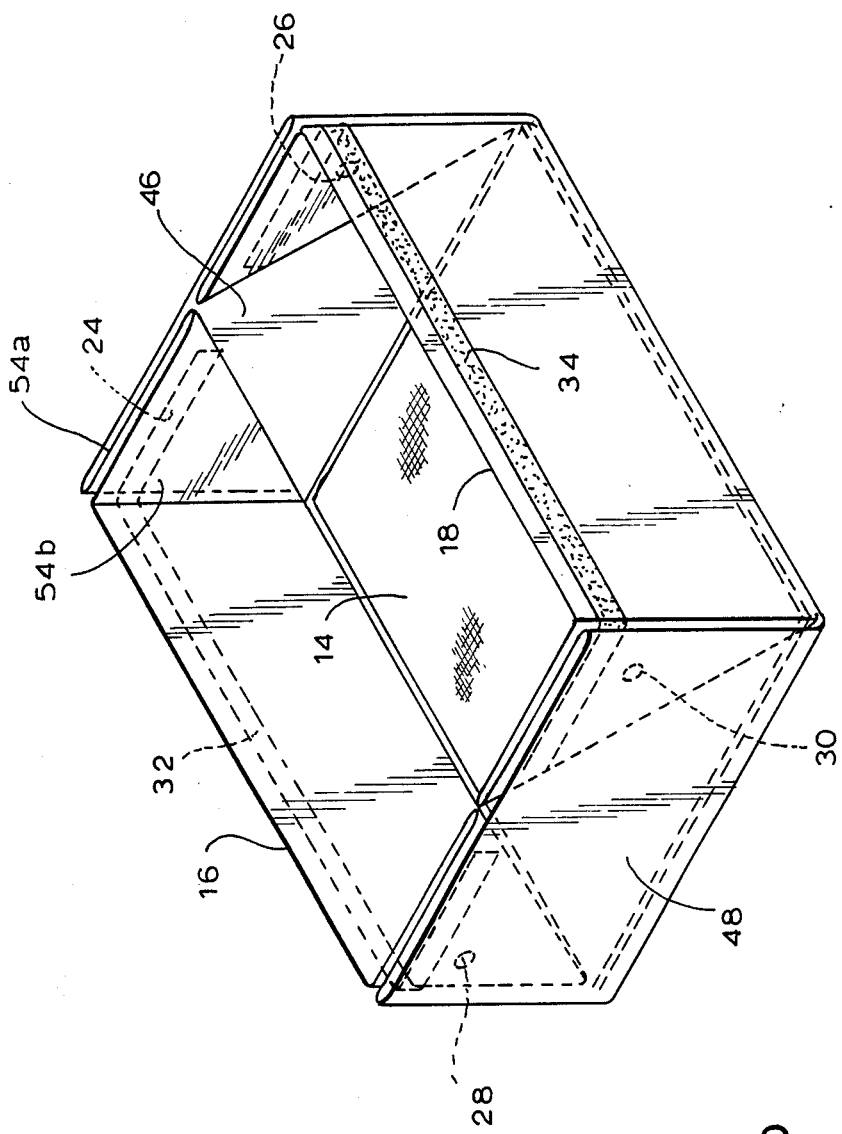
FIG. 3b illustrates the step after partially unfolding, with the corners folded to show the box-like liner.

In FIG. 3 there is shown the pad of FIG. 1 which has been folded along two lines roughly parallel and adjacent to the side edges 51, 53 of the pad to form generally a C-folded product. As shown edges 16 and 18 overlap as a consequence of the fact that the width of pad 14 is less than the combined widths of panels 50 and 52. The panels, in folded condition are held in place by glue spots 24, 26, 28 and 30 (not shown in FIG. 3).

Figure 4:
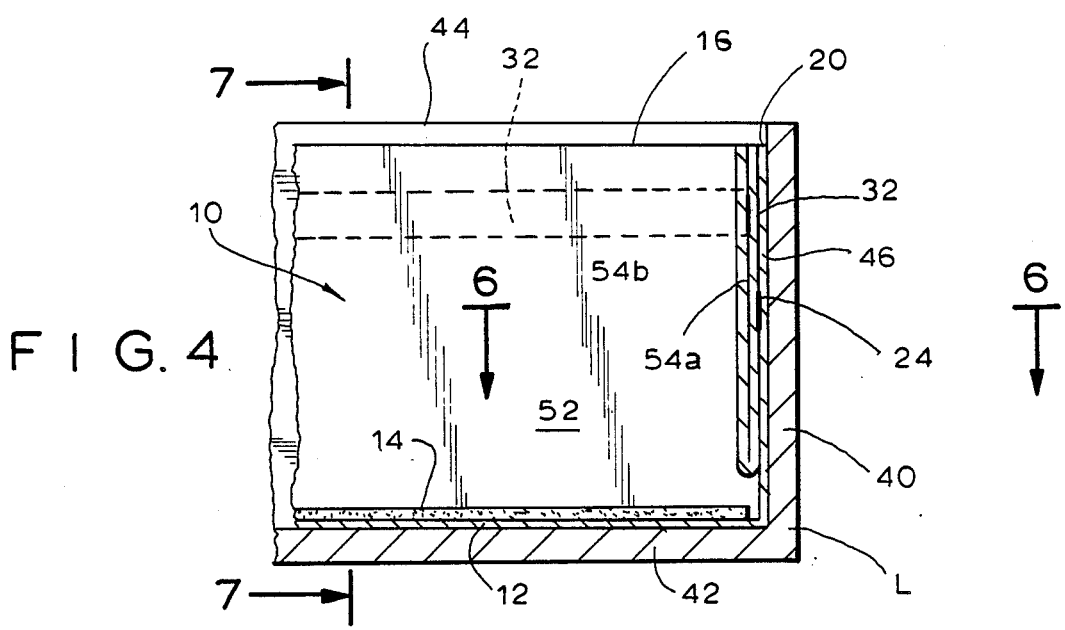
FIG. 4 is a vertical sectional view through an end wall of a litter box showing the liner installed; and,
FIG. 5 is a sectional view similar to FIG. 4, but showing the installation of the absorbent liner in a different size litter box.
Figure 6:
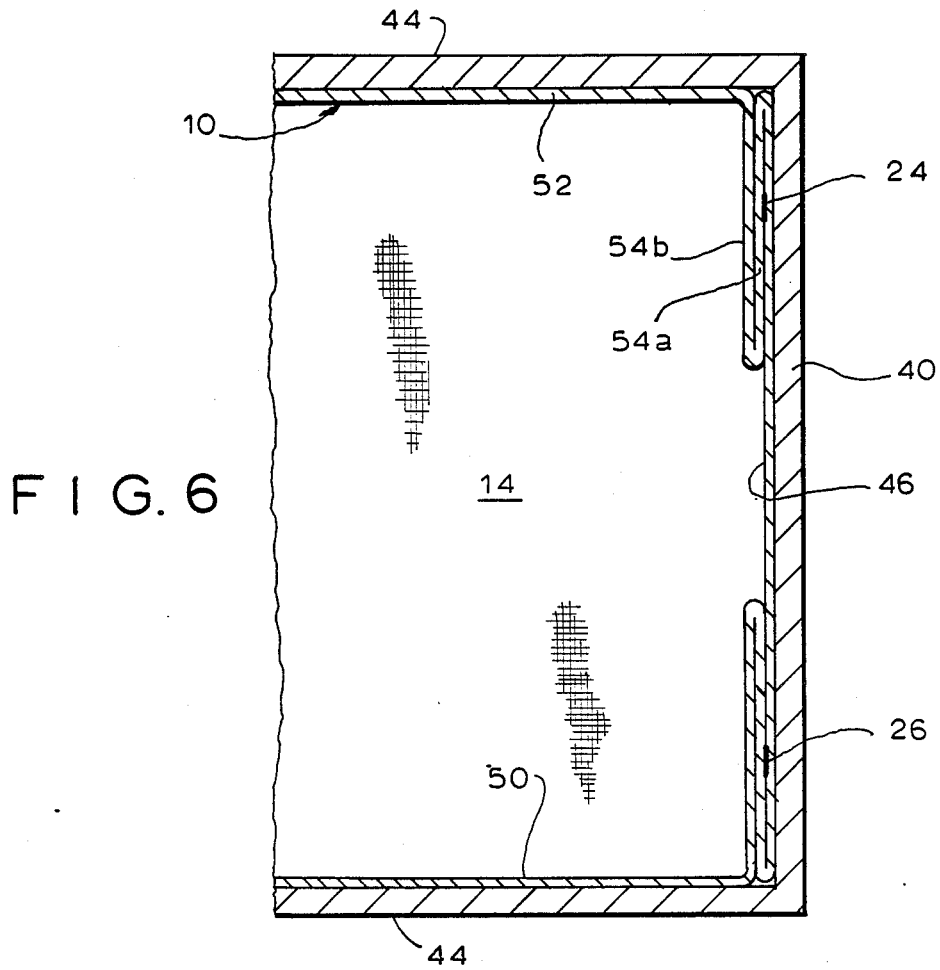
FIG. 6 is a sectional view taken along the plane of line 6—6 in FIG. 4; and,
FIG. 7 is a sectional view taken along the plane of line 7—7 in FIG. 4.
Figure 7:
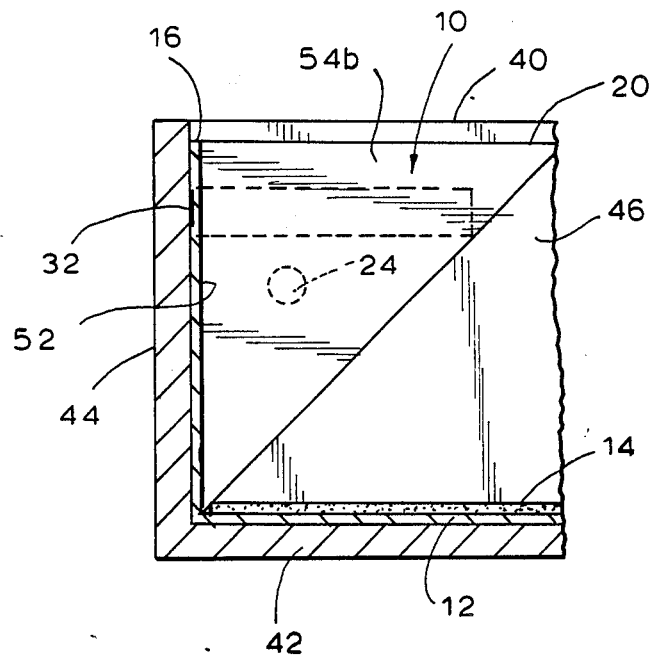

In FIG. 4, there is shown a litter box L, which has an end wall 40 and a base 42, as well as side walls 44. When the liner 10 is placed in the litter box L, it will assume a box-like shape with end panels 46 and 48 and side panels 50 and 52 of a size depending on the size and shape of the litter box L. Triangular corners 54a, 54b are formed at the corners of the litter box L.

The liner 10 substantially automatically forms itself into the box-like configuration. The glue lines or spots 24, 26, 28 and 30 serve to hold the triangular corners tight against the end panels 46 and 48, while the glue spots or lines 32 serve to hold the liner 10 and bond it to the litter box. The glue spots or lines 34 serve also to bond the liner to the litter box.

Figure 5:
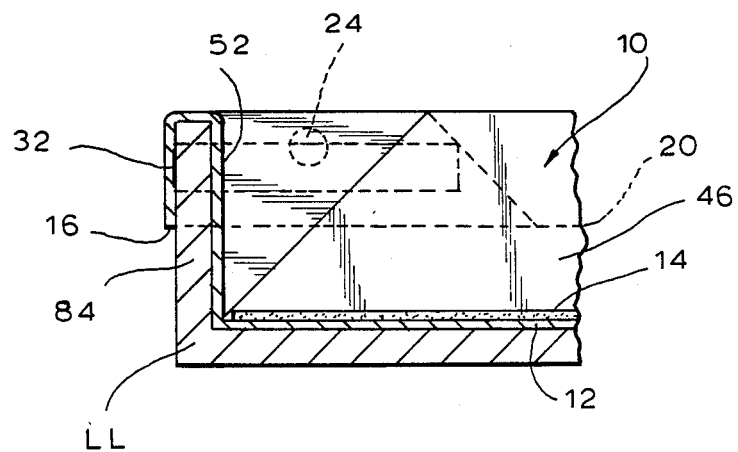

In FIG. 5, there is shown a modified form of litter box LL, wherein the length of the litter box plus the height of its end walls 84 is such that the panels 50, 52 overlap the end wall 84 so that the glue lines or spots 32 adhesively bond the liner 10 to the outer surface of the end wall 84.

In use, the liner is placed over the litter box L or LL so that it assumes its box-like configuration and the pressure-sensitive glue spots or lines 24, 26, 28 and 30, as well as 32 and 34, will hold the liner in position for use after simple pressure is applied and may be easily removed with animal waste and use absorbent material therewithin. The glue lines or spots 32 and 34 as shown preferably are elongated to insure sufficient adhesion to end walls 40 or 84 of the litter box L or LL, as well as to the side walls 44.

While glue spots or lines 24, 26, 28 and 30 are shown on end panels 46 and 48, they could alternatively be placed on side planes 50 and 52.

What is claimed is:

1. A litter box liner comprising a rectangular absorbent pad having a waterproof backing sheet, first adhesive means on the top surface of said backing sheet for holding said liner in a rectangular box-like configuration conforming to the contours of a litter box, and second adhesive means on the bottom surface of said backing sheet for adhesively detachably bonding said liner to the peripheral wall of a litter box.

2. A liner for use in combination with a litter box having a peripheral wall, said liner comprising an absorbent pad having a waterproof backing sheet provided with absorbent material thereon, first adhesive means on the top surface of said backing sheet for holding said absorbent pad in a box-like configuration when placed in said litter box to conform to the contours of said peripheral wall of said litter box, and second adhesive means on the bottom surface of said backing sheet for adhesively removably bonding said liner to said peripheral wall of said litter box.

3. A liner according to claim 2, wherein said second adhesive means bonds said liner to the inner surface of said peripheral wall.

4. A liner according to claim 2, wherein said second adhesive means bonds said liner to the outer surface of said peripheral wall.

5. A liner according to claim 2, wherein said second adhesive means extends intermittently about said peripheral wall.

* * * * *